United States Patent [19]

Stuhrmann et al.

[11] Patent Number: 4,659,102
[45] Date of Patent: Apr. 21, 1987

[54] FRONT HITCH ASSEMBLY

[75] Inventors: Heinz Stuhrmann, Schwetzingen; Robert Kryscyk, Ketsch, both of Fed. Rep. of Germany

[73] Assignee: Deere & Company, Moline, Ill.

[21] Appl. No.: 797,713

[22] Filed: Nov. 13, 1985

[30] Foreign Application Priority Data

Nov. 22, 1984 [DE] Fed. Rep. of Germany ....... 3442557

[51] Int. Cl.⁴ .................... A01B 63/108; A01B 63/11
[52] U.S. Cl. .................................... 280/481; 172/275; 280/759
[58] Field of Search .................. 280/481, 415 R, 755, 280/758, 759; 172/272, 275, 439, 483, 611, 810

[56] References Cited

U.S. PATENT DOCUMENTS

| 3,135,404 | 6/1964 | Pilch | 280/759 X |
| 4,093,259 | 6/1978 | Stedman | 280/758 X |
| 4,164,985 | 8/1979 | Bobard | 172/810 X |
| 4,181,181 | 1/1980 | Old | 280/481 X |
| 4,424,870 | 1/1984 | Weiss | 172/810 |
| 4,518,305 | 5/1985 | Stuhrmann | 280/755 X |

FOREIGN PATENT DOCUMENTS

| 225985 | 2/1963 | Austria | 280/481 |
| 0012780 | 7/1980 | European Pat. Off. | |
| 2225891 | 1/1974 | Fed. Rep. of Germany | 280/755 |
| 2804129 | 8/1978 | Fed. Rep. of Germany | |
| 2927736 | 1/1980 | Fed. Rep. of Germany | |

Primary Examiner—John J. Love
Assistant Examiner—Charles R. Watts

[57] ABSTRACT

A connecting and coupling arrangement for frontal attachment to a tractor includes at least one lower link, an actuating means, an angle lever, an optional upper link and a lift strut for connection to an item of equipment. Connected to the working vehicle is a frame which can slidably carry an ancillary frame which can be connected to an item of equipment or to a weight. In addition, the frame and the ancillary frame may be displaced in the direction of the longitudinal center plane of the tractor to increase the stability thereof.

13 Claims, 8 Drawing Figures

FRONT HITCH ASSEMBLY

BACKGROUND OF THE INVENTION

The invention relates to a connecting and coupling arrangement for attachment to the front of a vehicle, such as a tractor.

The known connecting and coupling arrangement of EP-B1-0 012 780 includes a large number of individual components which can only be used for the single purpose of lifting from the ground, carrying or setting down on the ground an item of equipment, such as a mower, which is to be mounted on the arrangement.

In another known hitch system, the actuating means may be used both for displacing lower links and also for vertically lifting a weight. However, the actuating means and the weight are arranged within a front end region of a tractor and are thus not accessible from the exterior, nor are they suitable for any other purpose than lifting a weight which is set down directly beneath the hitch system. In addition, this hitch system does not permit other possible uses.

Another hitch system (DE-A-2 804 129) has a three-point hitch which is connected to an ancillary frame and which can be moved up and down in a frame and which is pivotable with the frame relative to the working vehicle. In this case, the working vehicle is a portal-type tractor for attending to tall plants, and the entire hitch system is designed only to pick up equipment from the ground. There is no further function to be attributed to the individual components, as well as to the entire hitch system.

Finally, a different hitch system is known from DE-A-2 927 736. This system connects a weight to an agricultural tractor and has a roller-type carrier which is mounted to the agricultural tractor at the front and the tail thereof. A plate, which extends lengthwise beneath the tractor with the weight, is mounted displaceably into the roller-type carriers, and is displaceable, with the weight, transversely and longitudinally with respect to the tractor, by way of hydraulic cylinders. However, the plate must first be lifted to the mounting height of the roller-type carriers by way of a plurality of lifting jacks before the plate can be introduced into the roller-type carriers. This hitch system can also only be used for connecting such a plate with a weight.

SUMMARY OF THE INVENTION

Accordingly, an object of the present invention is to provide a hitch system wherein at least some of the individual components thereof can be used for multiple purposes in that the working vehicle has a frame with guideways in which an ancillary frame is vertically displaceable by way of co-operating guide members provided on the ancillary frame. The ancillary frame can be set down on the ground and connected to items of equipment, weights or the like.

In this way, the actuating means and the angle lever may be used for a further function. Because the height of the ancillary frame is adjustable, it can be used to pick up a tub or drum which can be carried at the front of the tractor while operating in the field. It would also be possible to lift a weight from the ground to provide ballast for the tractor and to move it into a transportation position on the tractor.

The frame and the ancillary frame are movable relative to the working vehicle in the fore-and-aft direction. This permits the center of gravity of the working vehicle to be displaced in such a way that it does not so easily rear up about its rear wheels. This additional stability is provided simply by the movement of the weight, without increasing the mass thereof.

The lift strut can be selectively connected to the angle lever and the ancillary frame. In that case, it is only necessary for the lift strut to be released from the lower link and joined to the ancillary frame. Thus, the actuating means, the angle lever and the lift strut can be used for multiple functions.

Furthermore, the function of carrying and displacing a weight or an item of equipment and attaching an item of equipment may be carried out simultaneously because the ancillary frame can be fixed in a raised position, and the free leg of the angle lever can be connected to the lower link. This hitch system can then be used simultaneously for carrying a weight and for coupling to an item of equipment.

The one leg, which is connected to the actuating means, can be connected to the ancillary frame by way of the lift strut. The frame is displaceable by way of pivotal movement of the angle lever in the direction of the longitudinal center plane of the tractor. In that way, the lift strut, the actuating means and the angle lever are used for longitudinal displacement of the frame with the ancillary frame. The actuating means, the angle lever and the lift strut thus serve for operation of the connecting and coupling arrangement itself, for raising or lowering the ancillary frame and for producing longitudinal displacement of the frame with the ancillary frame and a weight or item of equipment therein.

Preferably, the actuating means is a double-acting, hydraulic cylinder. This permits the ratio between the loadings on the rear wheels and the front driven wheels to be varied according to the traction conditions. To reduce excessive slip, front wheel traction can be enhanced by moving the frame with a weight in a forward direction. While travelling on public streets, the frame with the weight can be drawn back into a position in which it is towards the tractor.

DETAILED DESCRIPTION

Figure 1:
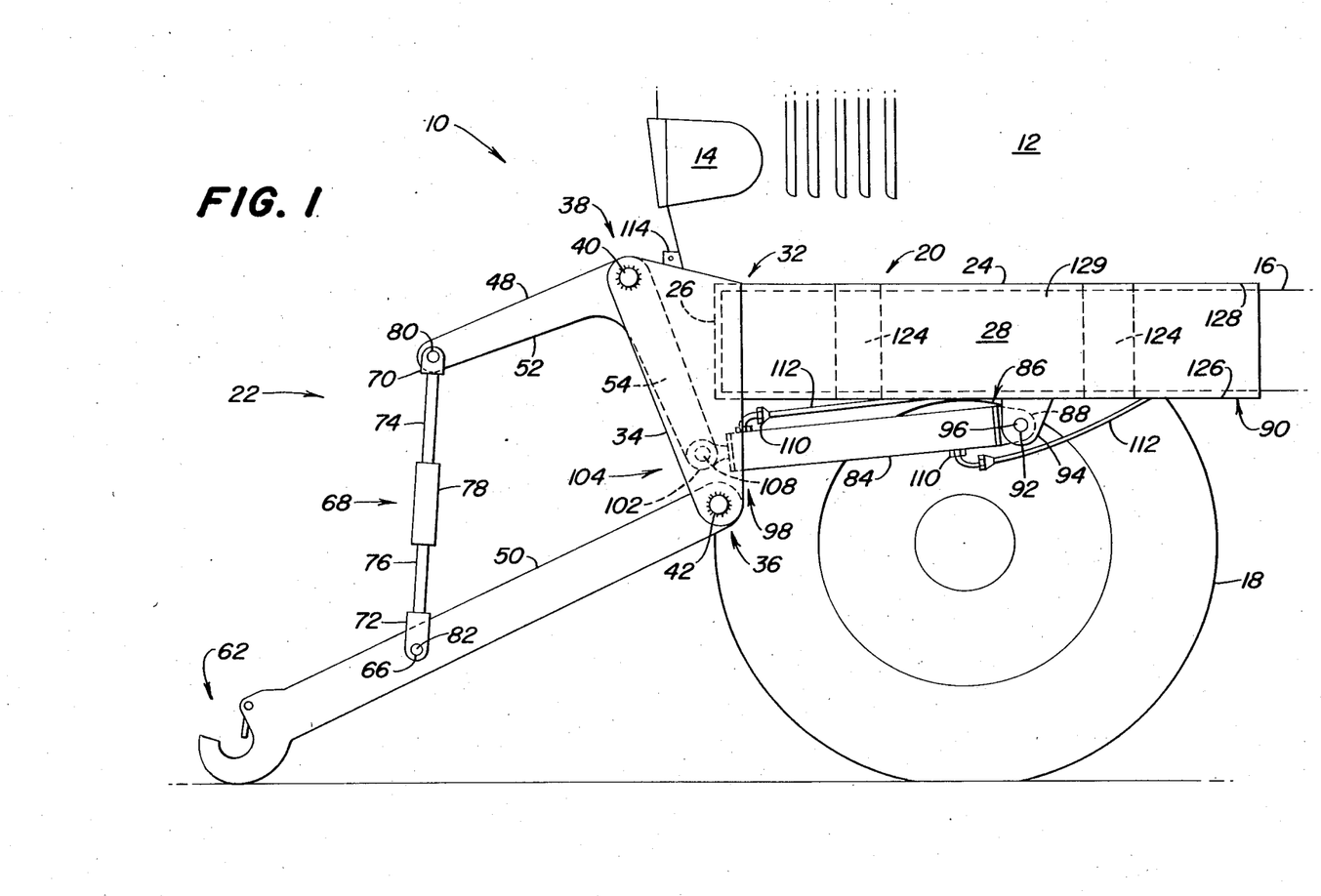
FIG. 1 shows a side view of a front part of a tractor with an implement hitch system.

FIG. 1 shows a front part 10 of an agricultural tractor with a cover hood 12 for an engine (not shown) and a front headlight 14. The hood 12 is fitted onto a vehicle frame structure 16 which is formed either as a half frame or as a full frame so that implements or other equipment can be mounted on the front of the tractor. Also shown in FIG. 1 is a right-hand front wheel 18. The left front wheel and the entire front axle have been omitted from the drawing for the sake of clarity.

Figure 7:
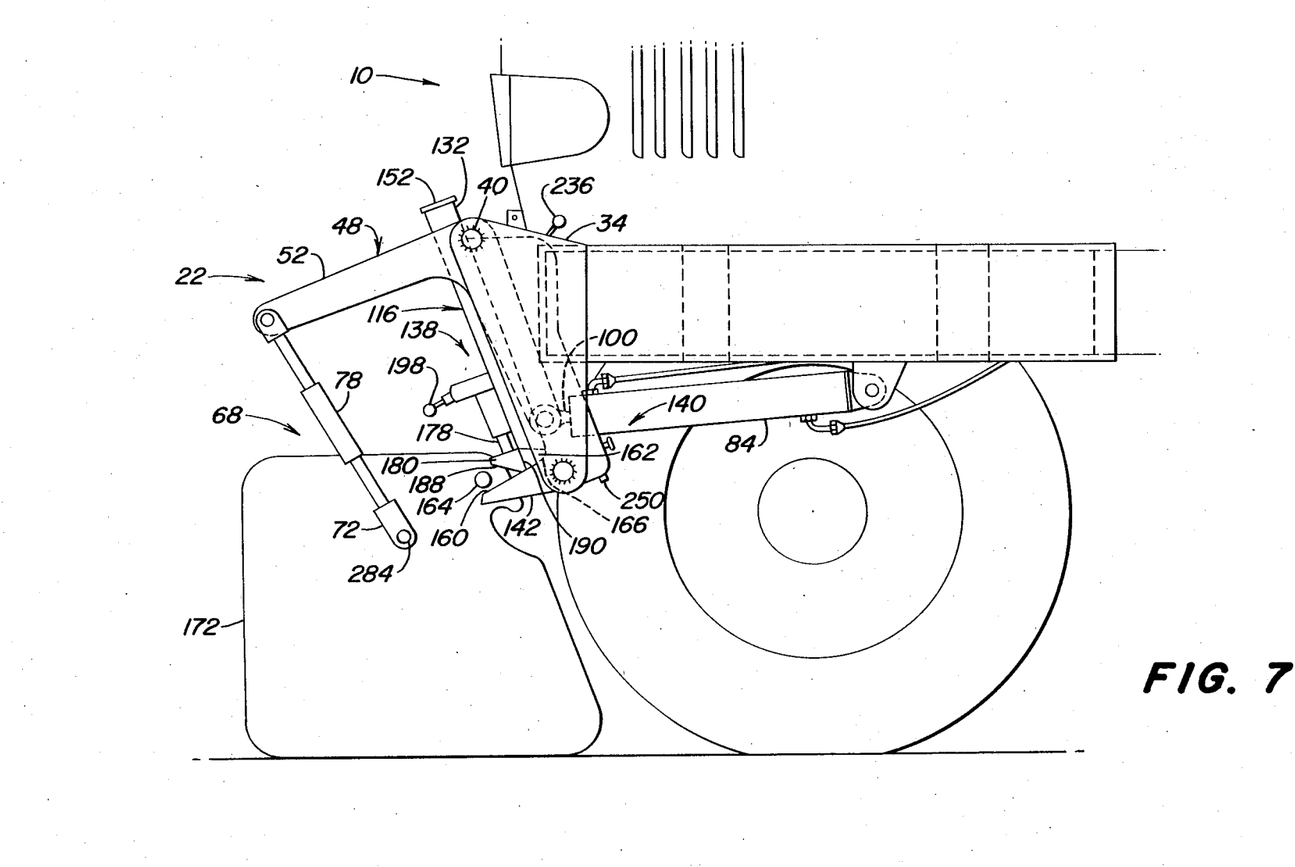
FIG. 7 shows a side view of the front part of the tractor with a ballast weight carrier mounted thereon and the ballast weight block ready to be picked up.
Figure 8:
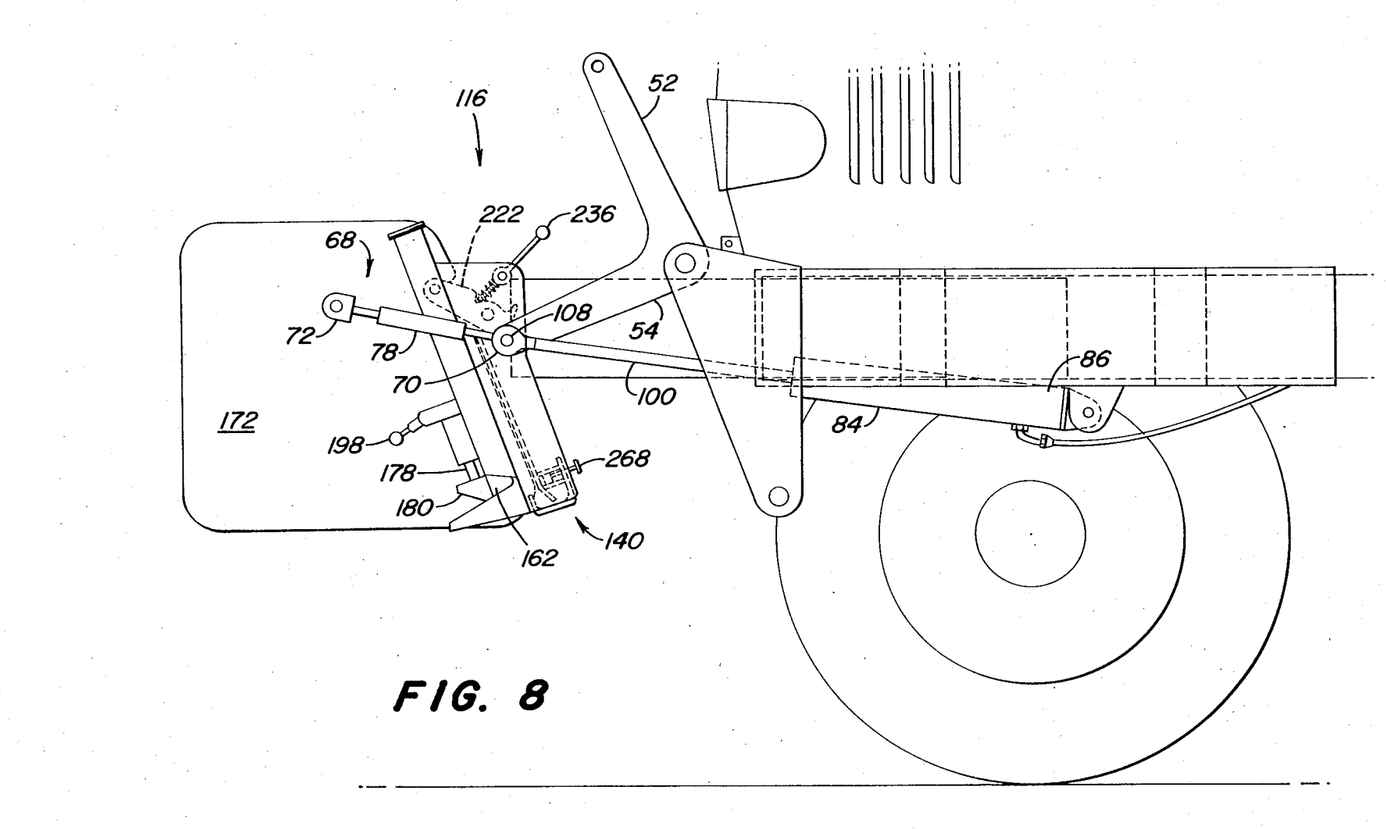
FIG. 8 shows the ballast weight carrier with the ballast weight block in the pick-up condition and in a position in which it is away from the front part of the tractor.

For the purposes of simplification in the description, terms such as front, rear, rearward, left, right, up and down are used hereinafter, it being appreciated that such terms relate to the direction of forward movement of the tractor. Accordingly, FIGS. 1, 7 and 8 show the front part 10 of the tractor from the left-hand side thereof.

Mounted in a front end region 20 of the vehicle frame structure 16 is a hitch system or appliance mounting arrangement 22 which is formed symmetrically with respect to the vertical longitudinal central plane of the tractor, for which reason the following description only relates to one side, although all the described matter is to be found in duplicated form unless indication is given to the contrary. The arrangement 22 is mounted on a U-shaped main frame 24 with a transverse member and two side members, 26 and 28, being welded up from U-section steel. The sectional size of the side members 28 is so selected that they can just accommodate the vehicle frame structure 16 in their space which is defined by upper and lower limb portions 126 and 128 and a web portion 129. The main frame 24 is pushed from the front over the vehicle frame structure of the tractor so that it can form a positive connection thereto. As soon as the main frame 24 has reached its definitive position, it is secured by way of commercially available screws or securing plug members (not shown). A vertically disposed mounting bracket 34, which is of a triangle-like configuration, is welded or screwed into position on the front of frame 24. The bracket 34 has upper and lower forward corner regions 36 and 38. Provided at corner regions 36 are transversely extending upper and lower pins or journals 40 and 42. Each of the corner regions 36 and 38 has a respective bore (not shown) therein for accommodating the pins or journals 40 and 42, with a respective pin or journal 40 or 42 being fitted into the appropriate bore and welded to the mounting bracket 34 in order to provide a firm mounting for a lift arm 48, which is formed as an angle lever on the upper journal 40, and a lower link 50 on the lower journal 42. The lift arm 48 comprises upper and lower legs 52 and 54 which are approximately equal in length and which are formed from a hollow-shaped member or a flat section of steel which is of suitable dimensions. Formed in the lift arm 48 are three bores (not shown), more specifically a middle bore at the point of intersection of the two legs 52 and 54, a front bore in the terminal region of the upper leg 52 and a rearward bore in the terminal region of the lower leg 54. The middle bore serves for pivotally receiving the upper journal 40. The lift arm 48 can perform a pivotal movement in a vertical plane and is secured to prevent it from falling off the upper journal 40 with a securing pin (not shown) which passes through the upper journal 40.

At its front end, the lower link 50 has a catch hook 62 for connecting to a working implement, while at its rearward end it has a ball joint (not shown) for accommodating the lower journal 42. Between the two ends, but disposed more towards the hook 62, it has a bore 66. The fact that the lower link 50 is fixed on the lower journal 42 by means of the ball joint also permits the lower link 50 to perform a vertical pivotal movement. A lift strut 68 extends between the bore 66 in the lower link 50 and the front bore of the upper arm 52, and comprises two threaded rods 74 and 76 which are each provided with a fork end 70 and 72. The threaded rods 74 and 76 have screw threads of opposite pitch and are rotatably received in a threaded sleeve 78. One fork end 70 is connected to the lift arm 48 by way of a pin 80 which extends through the front bore in the upper leg 52 and the fork end 70. The other fork end 72 is connected to the lower link 50 by way of a further pin 82 which extends through the bore 66 in the lower link 50 and through the other fork end 72. Thus, vertical pivotal movement of the lift arm 48 also causes vertical pivotal movement of the lower link 50. In order to permit horizontal pivotability of the lower link 50, the front bore is also to be provided with a ball joint.

Vertical pivotal movement is produced by a double-acting hydraulic cylinder 84 which, at the piston end 86, is provided with an eye 88 which extends between two mountings 94 which are mounted to an underside 90 of the main frame 24 at a spacing from each other and which each have a bore 92, the eye 88 being pivotally connected to the mountings 94 by means of a pin 96. At the piston rod end 98, a hydraulic rod 100 is also provided with an eye 102 which pivotally receives a pin 108 which is fitted into the terminal region 104 of the lower leg 54. Provided adjacent each of the two ends 86 and 98 of the hydraulic cylinder 84 is a respective connection 110 for hydraulic hoses 112 which go to a control valve (not shown). Supplying pressure fluid to the piston end of the hydraulic cylinder 84 causes a pivotal movement of the lift arm 48 and the lower link 50 in an upward direction, that is to say, in the clockwise direction, as viewing the drawings. The lower leg 126 of the side portion 28 has an opening so that the hydraulic cylinder 84 can be pivoted upwardly to a sufficient degree.

Mounted between the two mounting brackets 34 on the transverse portion 26 of the main frame 24 is a mounting member 114 for an upper link (not shown). The arrangement 22, as described hereinbefore, is a three-point implement coupling arrangement which is suitable for attaching, for example, a mowing mechanism, a harrow, a cultivator or the like.

FIGS. 2 to 8 show the increased utility of the arrangement 22 in that it can carry an item of equipment or a container, instead of the weight.

Figure 2:
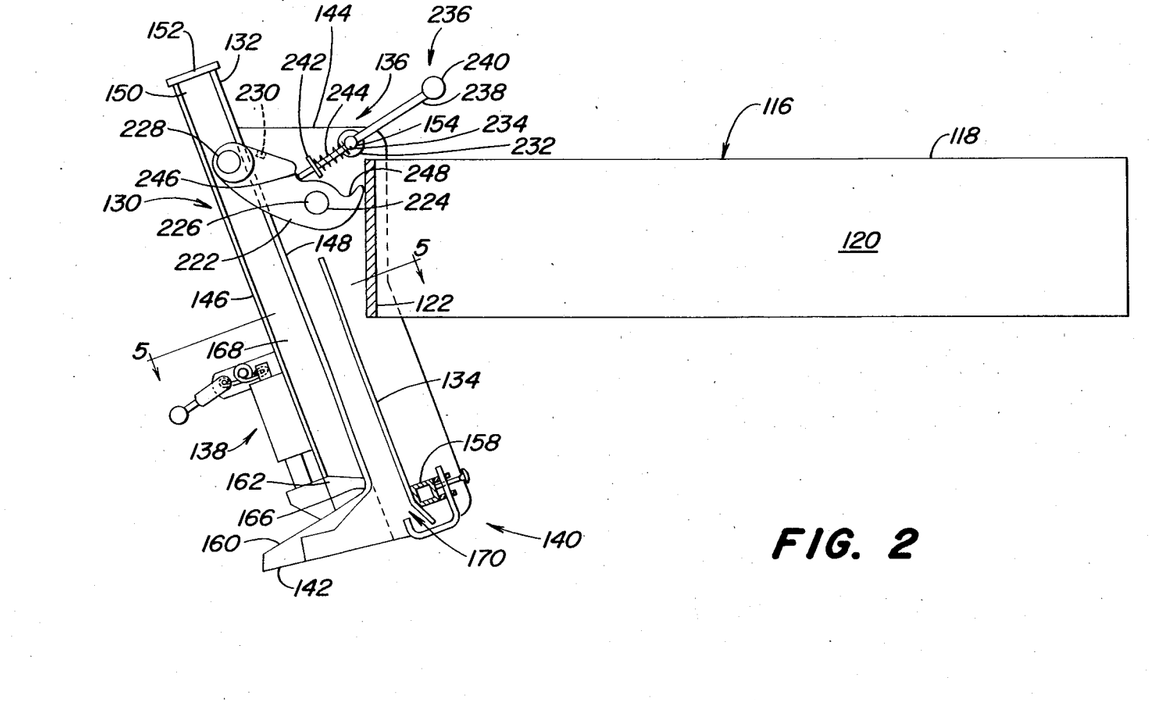
FIG. 2 shows a view in vertical longitudinal section of a ballast weight carrier.

Thus, the arrangement includes ballast weight carrier 116, which, similarly to the main frame 24 of the equipment attachment arrangement 22, is provided with ancillary frame 118 which is of U-shaped configuration, comprising two frame members or side plates 120 and a transverse member 122. The width of the ancillary frame 118 is such that it can be pushed into position between the side members 28 of the main frame 24 and the vehicle frame 16. The side members 28 are each provided with two plates 124 which extend from the lower limb portion 126 of the U-shaped main frame 24 to the upper limb portion 128 and thus, close the section in that region. The plates 124 extend from the lower limb portion 126 to the upper limb portion 128, approximately at a position midway along the length of the limb portions. When the main frame 24 is pushed on, the plates bear against the vehicle frame structure 16. The respective space defined by a plate 124, a lower limb portion 126, an upper limb portion 128 and a web portion 129 is adjustable to accommodate therein a side member 120 and to guide it when the ballast weight carrier 116 is pushed into the attachment arrangement 22. The transverse member 26 of the main frame 24 is provided with two openings (not shown) through which the side members 120 of the ancillary frame 118 can be inserted between the main frame 24 and the vehicle frame structure 16. The ballast weight carrier 116 is fully pushed into the main frame 24 when the back of the trasverse member 122 comes to bear against the front of the transverse member 26.

Figure 5:
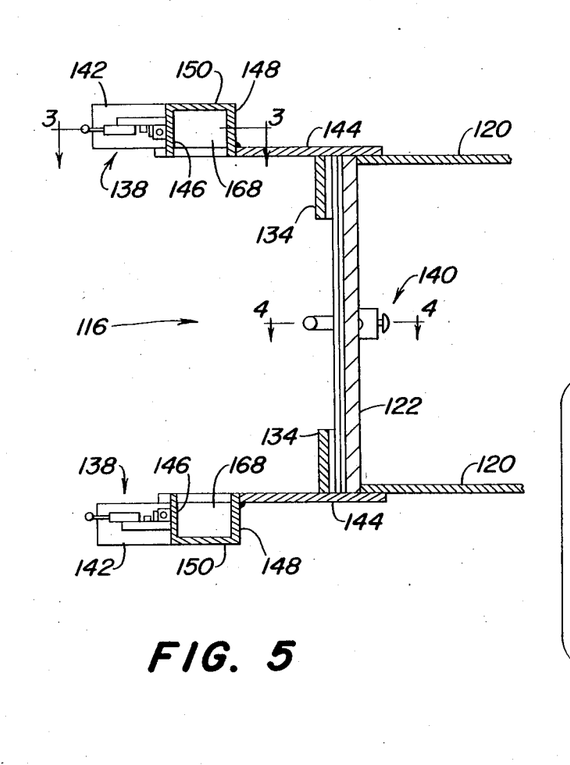
FIG. 5 shows the ballast weight carrier in section taken along line 5—5 of FIG. 2.

The transverse member 122 is rigidly connected to a slide means 130 which substantially comprises two shaped or slide rails 132, two contact surfaces 134, two upper and lower locks 136 and 138, a swinging or pendulum locking bar 140, two pick-up ramps 142 and two plates 144 which, with the exception of the locking member 140 which is disposed in the middle of the slide means 130, are arranged symmetrically with respect to the vertical longitudinal central plane of the tractor. The slide rails 132 are made from a U-section steel member with front, rear and outer limb portions 146, 148 and 150, and are closed at the upper ends by flat steel plates 152. The slide rails, like the entire slide means 130, are inclined slightly forwardly at the top and are at an angle of about 60 degrees with respect to the plane on which the tractor stands. Their open side is towards the vertical longitudinal central plane of the tractor. Secured to the rearward limb portion 148 of each of the slide rails 132 at the inner edge thereof is a respective rearwardly extending plate 144 which extends over almost the entire length of the slide rails 132 and which stationarily engages the outside surface of the ancillary frame 118. The plates 144 project downwardly beyond the slide rails 132 and at the projecting ends are connected to the ramps 142, for example by welding or screwing. At their upper ends, they are each provided with a respective bore 154 which is provided for the upper locks 136, as will be described in greater detail hereinafter. Extending between the two plates 144 and at the lower end thereof is a carrier 158 which, at its mid-length position, carries the locking member 140 and which serves for stiffening the entire slide means 130.

The ramps 142 are made from a forged steel which is relatively wear-resistant. They are in the form of a wedge member which rises towards the rear of the tractor. The ramps 142 are secured to the plate 144 in such a way that a gap 162 remains between the front limb portion 146 of the slide rail 132 and an upper face 160 of the ramp 142, the gap 162 serving for insertion of a slide bar or rod 164 shown in FIG. 6. and acting as a cooperating guide member. At their rearward ends, they are bent upwardly and by way of a concave fillet 166, lead to the rearward limb portion 148 of the slide rail 132 to form an uninterrupted slide surface along which the slide bar or rod 164 can slide and which blends into a guideway 168 which is enclosed by the limb portions 146, 148 and 150. A respective contact face 134 in the form of a flat steel plate which is about 10 cm in width is welded in position perpendicularly to the side of the plates 144 which is towards the vertical longitudinal central plane of the tractor and parallel to the rearward limb portion 148 of the slide rail 132. The contact face 134 extends over almost the entire length of the plate 144 and at its lower end, over a length of about 10 cm, is bent inclinedly rearwardly so as to provide an enlarged mouth region 170. This ensures that, upon picking up a weight with an ancillary frame, as in FIG. 6 of ballast weight block 172, the latter does not strike against the underside of the face 134 and is therefore not prevented from passing into the guideways 168 with its slide bar or rod 164.

Mounted to the front limb portion 146 of each slide rail 132 is the respective lower lock 138, the detailed construction of which is described with reference to FIG. 3. A locking pin 178 is slidably mounted in the housing 174 which is welded to the front side of the front limb portion 146 of the respective slide rail 132. The housing 174 has a longitudinal bore 176 which is disposed in parallel relationship to the slide rail 132. At its lower end which is towards the ramp 142, the locking pin 178 has a pentagonal base portion 180 which is screwed on to the lower end region of a shank portion 182 disposed in the longitudinal bore 176. The sides of the base portion 180 are selected so that one side 184 extends in parallel relationship to the upper surface 160 of the ramp 142 and can be brought into contact thereagainst under the force of a spring or spring element 186. A second side 188 forms a notch configuration with the upper surface 160 of the ramp. A third rearward side 190 extends at a right angle to the upper surface 160 of the ramp 142. Mounted above the housing 174 is a lever mounting 192 which extends in the direction of travel of the vehicle and which is made from flat steel. Two mounting pins 194 and 196 project at right angles from the mounting 192, for rotatably carrying on the one hand the locking lever 198, and on the other hand, the spring element 186. The locking lever 198 has a fork member 202 which includes a bore 200 for receiving the mounting pin 194. The fork member 202 is pivotable about the mounting pin 194 and at one end, has a screw threaded bore 204 into which can be screwed a threaded rod 206 having a ball head 208. At the other end, between two limb portions 210 which are defined by the fork configuration, the fork member 202 pivotably accommodates one end of the spring element 186, by means of a pin 214 which extends through the limb portions 210 and through an eye 212 formed on the end of the spring element 186. Besides the eye 212, the spring element 186 also has a further eye 216 which is disposed at the opposite end and, between the two eyes 212 and 216, a loop 218. The loop 218 extends around the other mounting pin 196 and forms thereon a mounting for the spring element 186. The further eye 216 is pivotally connected to the locking pin 178 by way of a pin 220 which passes through the shank portion 182 in the upper end region thereof. Thus, spring element 186 forms a positive connection between the locking lever 198 and the locking pin 178. Pivotal movement of the locking lever 198 in the clockwise direction, as viewing in FIG. 3, basically produces a rotary movement in a counterclockwise direction of the spring element 186 about the associated mounting pin 196 and an upwardly directed movement of the locking pin 178 by means of which the base portion 180 is moved away from the gap 162 which thus opens the entrance into the guideway 168. When the locking lever 198 is pivoted in the counterclockwise direction, the base portion 180 moves towards the ramp 142 until it comes into contact therewith and closes off the gap 162. In that position, the locking pin 178 can only be lifted against the force of the spring 186, as occurs when the slide rod or bar 164 slides along the upper surface 160 of the ramp 142 and passes into the guideway 168, in a manner which will be described hereafter. The locking lever 198 is pivotable between a locking position and an unlocking position. In the locking position, the locking lever 198 is in the lower limit position and the base portion 180 is supported on the ramp 142. In the unlocking position, the locking lever 198 is in its upper limit position in which the base portion 180 is lifted away from the ramp 142 by way of the spring element 186 to such a degree that the gap 162 is completely open. The locking lever 198 cannot automatically go from one limit position to the other as, upon pivotal movement thereof about the mounting pin 194, the pin 214 which carries the eye 212 describes a different circular path from the one that would be described by the eye 212 upon pivotal movement of the spring element 186 about the mounting pin 196 around which the loop 218 extends, without an additional force acting thereon. The locking lever 198 can be pivoted from one limit position to the other against the self-locking action which is produced by virtue of the superimposition of the two circular paths, only by a slight bending of the spring element 186. This can only be done by the application of an external force, for example, by an operator.

The upper locks 136 shown in FIG. 2 are respectively mounted to the upper end of the plates 144 on the inner side thereof. They each comprise a pivotable shaped plate 222 which, adjacent its one end region, has a bore 224 through which extends a mounting pin or journal 226 which is welded to the plate 144. The other end region of the plate 222 is rounded off and is provided with a round steel lug or projection 228 whose outside diameter corresponds to the diameter of the rounding of the other end region. It would also be possible to provide a rod which extends between the two plates 222 and which is connected thereto, instead of the provision of the round steel lug 228 on each plate 222. The plate 222 is provided with an abutment 230 which extends perpendicularly away therefrom and away from the vertical longitudinal central plane of the tractor so that it can be brought into contact against the rear limb portion 148 of the slide rail 132 to thereby hold the plate 222 is a position in which it extends approximately as far as the front limb portion 146 of the slide rail 132. The plate 144 also has the bore 154 disposed radially with respect to the mounting pin 226 and displaced rearwardly and upwardly therefrom. Through the bore 154 projects a stepped pin 232 which, although this is not shown in detail, comes to bear with a shoulder against one side of the plate 144 and which can be secured in position with a threaded portion which passes through the bore, and a nut which bears against the oher side of the plate 144. A spacer sleeve which is pushed onto the threaded portion also extends between the nut and the shoulder, and provides a spacing between the shoulder and the nut, which is slightly greater than the gauge of the plate 144 so that, although the stepped pin 232 comes to bear against the plate 144 on both sides thereof, it only applies thereto slight frictional forces which still permit the stepped pin 232 to turn in the bore 154. Provided in the stepped pin 232 is a bore 234 in which a securing lever 236 is slidably guided. The securing lever 236 essentially comprises a rod 238 which is provided with a ball head 240 at one end and, adjacent its other end, has a support pin 242 which extends transversely through the rod 238. A compression spring in the form of a coil spring 244 is fitted onto the rod 238 and, in the assembled condition, extends between the pin 242 and the stepped pin 232, thereby ensuring that the securing lever 236 is always moved away from the stepped pin 232 towards the plate 222. On each side of a radial line which interconnects the center points of the mounting pin 226 and the stepped pin 232, adjacent the bore 224, the plate 222 has notches 246 and 248 disposed on the side of the plate 222 which is towards the securing lever 236. The end of the rod 238 which is remote from the ball head 240 can be selectively fitted into the respective notches 246 and 248 and arrested therein by means of the coil spring 244. Because the notches 246 and 248 are disposed laterally with respect to the center point of the bore and thus, the pivot point of the plate 222 on the mounting pin 226, the securing lever 236, with the coils spring 244, applies a moment to the plate 222. This moment causes the plate to be automatically pivoted either in the clockwise direction or in the counterclockwise direction. The two notches 246 and 248 are referred to as the locking notch and the unlocking notch, respectively, to indicate their purpose. In order to move the securing lever 236 from the locking notch 246 into the unlocking notch 248, the lever is pulled away from the plate 222 against the force of the coil spring 244. By using the ball head 240 on the lever 236, the lever is then pivoted, together with the stepped pin 232, towards the unlocking notch 248, and then is allowed to slide there onto.

When the securing lever 236 has been fitted into the locking notch 246, the plate 222 is then moved towards the other limb portion 146 of the slide rail 132 until the abutment 230 bears thereaginst. When it is in the unlocking notch 248, it is pivoted out of the region of the guideway 168, in the clockwise direction, as viewing on FIG. 2. The mode of operation and the purpose of the upper locks 136 will also be described in greater detail hereinafter.

Figures 3, 4:
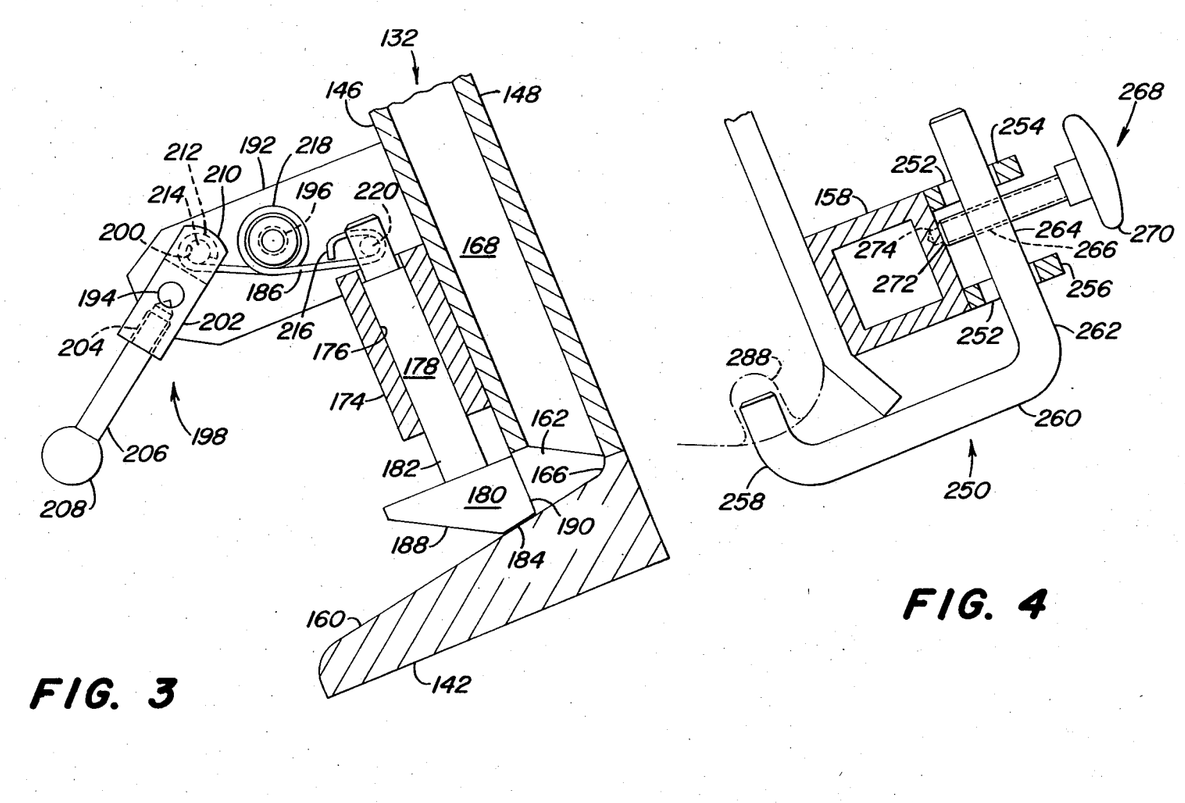
FIG. 3 shows a lower lock of the ballast weight carrier in the direction of arrows 3—3 of FIG. 5.
FIG. 4 shows a view of a swinging locking bar viewing in the direction of arrows 4—4 of FIG. 5.

Referring now to FIG. 4, the locking member 140 comprises a loop or bracket which is bent twice in one plane in opposite directions through 90 degrees. The bracket 250 is fitted into and is displaced and pivotable in two upper and lower bars 254 and 256 which are welded to the carrier 158 and which are provided with mutually aligned slots 252. The bent configuration of the bracket 250 provides three portions, namely a first short portion 258 extending substantially in the direction of the slide rails 132, a second portion 260 which extends normal to the portion 258 and a third long portion 262 which extends parallel to the first portion and which extends through the slots 252. Provided on a part 264 of the long portion 262, more particularly between the upper and lower bars 254 and 256, is a threaded bore 266 which is directed in parallel relationship to the second position 260 for accommodating an arresting screw 268 which is provided at one end with a handle 270 and at the other end with a projection 272 which is not threaded. The projection 272 can be fitted into a recess 274 of corresponding configuration in the carrier by turning the arresting screw 268 towards the carrier 158. When the projection 272 has reached the recess 274 and if the arresting screw 268 continues to be turned, then the bracket 250 is moved away from the carrier 158 in the slots 252 and finally comes to bear against the ends of the slots 252 which are remote from the carrier 158, where it is held by frictional engagement and is secured against any further movement. In that position, the second portion 260 faces in the direction of the longitudinal central plane of the tractor. The length of the third portion 262 is such that, in the locking position of the locking member 140, the third portion 262 projects beyond the upper bar 254 at least by the length of the first portion 258.

Figure 6:
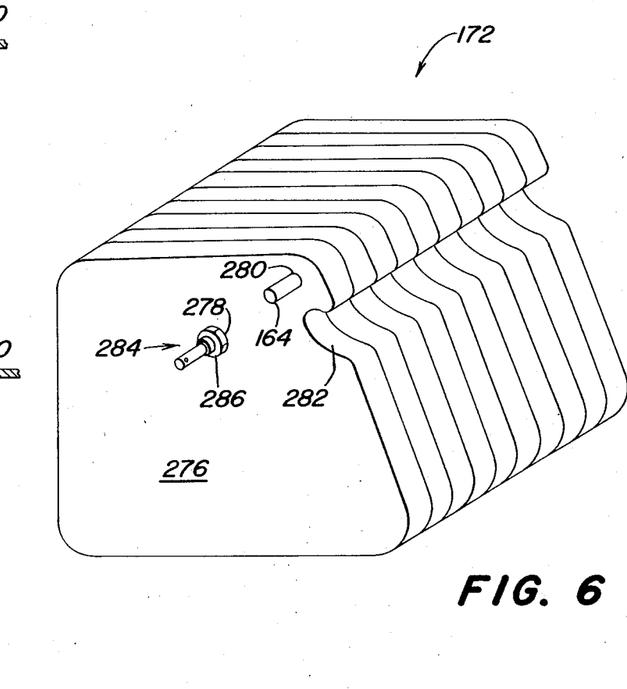
FIG. 6 shows a perspective view of a ballast weight block formed from a plurality of ballast weights.

Referring now to FIG. 6, the ballast weight block 172 is formed from a plurality of ballast weights 276. The ballast weight block 172 comprises ten ballast weights 276 which are generally of an identical configuration and each of which weighs about 50 kg. The ballast weights 276 are substantially of trapezoidal form and have first and second openings 278 and 280 as well as a hook-shaped opening in the form of a hook eye 282. Through the first opening 278 extends a rod 284 which, in conjunction with the slide rod or bar 164 which is pushed through the second openings 280, prevents the ballast weights 276 from slipping relative to each other, and serves as an ancillary frame for the ballast weight block. The rod 284, which extends through the first opening 278 on the shank portion thereof which projects out of the ballast weight block 172, is, for that purpose, partially provided with a screw thread onto which a respective securing nut 286 is screwed to act as a clamping means. The two nuts 286 are tightened so firmly that the ballast weights 276 bear against each other so that they cannot rattle or chatter. However, it is also possible to omit the one nut 286 and the screw thread at the one end, and in their place, to turn thereon a shoulder which bears against the outer ballast weight 276. The length of the rod 284 which is passed through the first openings 278 is such that it projects beyond the tightened nuts 286 by an amount which is sufficient for the respective lift spindles 68 still be be fitted thereon, by means of their other fork ends 72. In the region in which the other fork ends 72 are fitted, the rod 284 is reduced somewhat in relation to the portion bearing the screw thread and is devoid of thread, so that the screw thread only begins behind that portion and is thus not damaged when the other fork end 72 if fitted onto the rod. The slide rod or bar 164 is only fitted into the second openings 280 and does not have any effect on tightening the ballast weights 276 against each other. However, it also projects beyond the ballast weight block 172 at its ends and, as will be described hereinafter, serves for guiding same in the guideways 168. The slide rod 164 is prevented from slipping sideways out of the second openings 280 by means of a securing ring (not shown). The slide rod 164 and the rod 284 form an ancillary frame for the ballast weights 276. It is also possible to design an ancillary frame similarly to a bell member which fits over the ballast weights 276. Whether the ancillary frame is of an integrated or a separate construction depends on the purpose of use thereof. If, instead of the ballast weights 276, for example, a container with liquid manure or an ancillary piece of equipment is selectively carried by the arrangement, then an ancillary frame, which can be selectively connected to the above-mentioned components, is found to be advantageous. In designing the ancillary frame, care should be taken to ensure that the mounting points which are connected to the equipment attachment arrangement and the ballast weight carrier 116 are always arranged in the same fashion.

The inner end region of the hook eye 282 is adapted to the outside diameter of the round steel projection or lug 228 which is fitted to the plate 222 so that the plate 222 can be fitted at one end into the hook eye 282. As shown in FIG. 4, a depression 228 is provided in the underside of ballast weight 276 which is at the center of the ballast weight block 172. The depression 228 extends parallel to the slide rails 132 and is capable of receiving therein the first portion 258 of the bracket 250. The middle two ballast weights 276 may be omitted and replaced by sleeves in the region in which the rod 284 and the slide rod 164 pass through the ballast weight block, so that, even when ballast weights 276 are being carried, the upper link can perform an unimpeded vertical movement. In that case, it is possible either to omit using the locking member 140, or the locking member 140 can be laterally displaced on the carrier 158, for which purpose the upper and lower bars 254 and 256 would be made movable. However, the middle ballast weights 276 could be provided with a pusher means or a tow jaw for connection to a trailer or another motor vehicle. Of course, the pusher means would have to be mounted on the mounting 114 for the upper link. The center of gravity of an item of equipment or the ballast weight block 172 which is to be connected to the ancillary frame is disposed on the side of the rod 284 which is remote from the ballast weight carrier 116.

MODE OF OPERATION

The mode of operation of the equipment attachment arrangement 22 and the ballast weight carrier 116 is described hereinafter with reference to the foregoing description and in conjuction with FIGS. 7 and 8.

FIG. 7 shows the front part 10 with the attachment arrangement 22 already pushed into position, and with the ballast weight carrier 116 pushed into the arrangement 22. The upper link and the lower links 50 of the arrangement 22 have been removed, although they would not cause any problem when picking up the ballast weight block 172. The piston 100 of the cylinder 84 is completely retracted and the upper leg 52 of the lift arm 48 is in its lowest position. The locking levers 198 of the lower lock 138 are in their locking position, the securing levers 236 of the upper locks 136 are fitted into the locking notches 246, and the bracket 250 of the locking member 140 has been pivoted into a position transversely with respect to the locking position. The ballast weight carrier 116 is now in its starting position for picking up the ballast weight block 172. From this position, the tractor is driven towards the ballast weight block 172 until the slide rod 164 comes to bear against the upper surface 160 of the ramps 142. Then, to pick up the ballast weight block 172, the lift spindles 68, whose other fork ends 72 are free after the lower links 50 have been disconnected, are respectively connected to the shaft portions of the rod 284 which project beyond the securing nuts. In otherwords, they are pushed with the bores provided in the other fork ends 72 over the rod 284 and are secured thereon. This is not shown in detail for the sake of clarity of the drawings. For that purpose, the lift spindles 68 are possibly to be adjusted in respect of length by rotation of the threaded sleeves 78, to match them to the spacing between the rod and the front bore in the upper leg 52 of the respective lever arm 48. After that, the tractor is slowly driven forward again whereby, due to the inclinedly extending upper surfaces 160 of the ramps 142, the slide rod 164 and therewith also the ballast weight block 172, are lifted at the side which is towards the front part 10. The lifting movement of the ballast weight block 172 is possible as, by virtue of its weight, the block 172 forms a frictional resistance with respect to the surface on which it is standing, which ensures that the ballast weight block 172 does not move from its position in spite of the pushing force acting thereon. During the sliding movement of the slide rod 164 on the upper surface 160 of the ramp 142, the slide rod 164 reaches the base portions 180 of the locking pins 178 of the lower locks 138 and there passes into the notch formed between the upper surfaces 160 and the second sides 188 of the base portions 180. The locking pins 178 are then lifted against the force of the spring elements 186 and permit the slide rod 164 to pass towards the guideways 168 of the slide rails 132. As soon as the slide rod 164 is between the rearward third sides 190 of the base portions 180 and the guideways 168 of the slide rails 132, the locking pins 178 are brought into contact again with the upper surfaces 168 of the ramp 142 by the spring elements 186 and again close off the gaps 162 at the entrace to the guideways 168 of the slide rails 132.

As the third sides 190 of the base portions 180 do not form notches with the upper surfaces 160 of the ramps 142, but are normal to such surfaces, if the slide rod 164 should be urged back against the locking pins 178 by the weight of the ballast weight block 172, the slide rod 164 cannot lift the slide pins 178 and thus, also can no longer come out of the guideways 168 as long as the locking levers 198 are not moved into their unlocking positions in which they lift the locking pins 178 by way of the spring elements 186.

Finally, the slide rod 164 comes to bear against the inward sides of the rearward limb portions 148 of the slide rails 132 and by way of the thrust movement described thereinafter, can pass over the fillets 166 into the guideways 168 of the slide rails 132. When the slide rod 164 bears against the fillets 166, the tractor is stopped and the hydraulic cylinder 84 is pressurized at the piston end. The extension of the hydraulic pistons 100 pivots the lift arms 48 about the respective upper journals on the brackets 34, in the clockwise direction as viewing on FIG. 7. The upper legs 58 of the lift arms 48, which move upwardly during the pivotal movement, entrain the ballast weight block 172 by way of the lift spindles 68. The ballast weight block 172 with the slide rod 164 then slides upwardly into the guideways 168 of the slide rails 132. The inclined mouth regions 170 of the contact surfaces 134 then ensure that the ballast weight block 172 satisfactorily comes to bear against the surfaces 134, with its rearward side. The extension movement of the hydraulic pistons 100 and thus, the pivotal motion of the lift arms 48, is continued until the slide rod 164 comes to bear against the flat steel plates 152 at the ends of the guideways 168.

The arrangement may possibly include a limit contact switch which interrupts the feed of pressure fluid to the hydraulic cylinders 84 when the slide rod 164 has reached its limit position. However, in moving into that limit position, the ballast weight block 172 also bears against the plates 222 which lie against the guide rails 132, and pivots them away in an upward direction and away from the guideways 168 in the clockwise direction in FIG. 2. As soon as the ballast weight block 172 has been lifted to such an extent that the rounded ends of the plates 222 can pass into the hook eyes 282, the plates 222 are pivoted into the hook eyes 282 with their rounded ends and the respective round steel lug 228 on each end thereof, by the coil springs 244 and the rods 238 of the securing levers 236, thereby forming a stop means on the guideways 168 which prevents a lowering movement of the ballast weight block. When the latter has reached its upper limit position and therefore the upper locks 136 have engaged into the hook eyes 282, the hydraulic pistons 100 can be relieved of load again and partially retracted until the ballast weight block 172 is carried on the plates 222 and the round steel lugs 228.

In that position, the bracket 250 of the lock member 140 is pivoted in the direction of travel of the tractor and lifted so that the short first portion 258 thereof engages into the depression 288. When that portion 258 has been fully inserted into the depression 288, the projection 272 on the arresting screw 268 is then aligned with the recess 274 in the carrier 158 and the arresting screw 268 can be turned by means of the handle 270 in order to clamp the bracket 250 fast into the slots 252. When the arresting screw 268 is tightened and upon longitudinal movement of the third portion 262 in the slots 252, the ballast weight block 172, due to the positive connection of the short portion 258 with the ballast weight block 172 by way of the depression 288, is pulled against the contact surfaces 134 and can no longer swing in the direction of travel of the vehicle about the round steel lugs 228 at the rounded ends of the plates 222, due to unevenness of the carriageway, which can have an effect on the ballast weight carrier 16 when travelling with the tractor on a bumpy section.

When the lower and upper locks 138 and 136 and the locking member 140 are in their locking positions and the ballast weight block 172 has been let down on to the plates 222 or the round steel lugs 228 thereon, the operation of picking up the ballast weight block 172 to put it in a position for transportation is concluded The additional weight, which is thus mounted on the front part 10 of the tractor, is generally sufficient to provide adequate ballasting of the front part 10 In that case, the lower links 50 can again be connected to the lift arms 48 and the hydraulic cylinders 84 by way of the lift spindles 68 and can be used as a pure implement attachment arrangement 22. The ballast weight block 172, which is carried, does not interfere with the movement of the lower links 50 and the upper link as it is in a free space around which the upper and lower links extend.

If an excessively heavy piece of equipment is applied at the rear of the tractor, it is then possible for the tractor to rear up at its front part 10 around its rear axle. This, however, is to be prevented as that can cause loss of steering by the front wheels 18 and can cause damage to the tractor when the front part 10 comes back down. In order to avoid a rearing effect of that kind, the ballast weight carrier 116 is arranged to be displaceable relative to the equipment attachment arrangement 22.

On the assumption that the ballast weight block 172 has been moved into its position for transportation in the above-described manner, for the purposes of displacing the ballast weight carrier 116, the two lift spindles 68 are to be released from the upper legs 52 and folded downwardly. This is possible because, after the ballast weight block 172 has been rested on the plates 222, the lift spindles 68 are unstressed. The hydraulic pistons 100 are then completely retracted so that the lower legs 54 of the lift arms 48 move into their rearward positions. Then, the one fork end 70 of the lift spindles 68 is brought into engagement with the pin 108 which serves for pivotally connecting the hydraulic piston 100 to the lower leg 54, while the other fork end 72 is still engaged to the rod 284. The lift spindles 68 are adapted in length to the distance between the rod 284 and the pins 108, as required by rotating the threaded sleeves 78. Therefore, each lower leg 54 is engaged jointly by the one end of the respective lift spindle 68 and the respective hydraulic piston 100. When the lift spindles 68 have been converted in that way, the piston end 86 of each hydraulic cylinder 84 is pressurized to extend the hydraulic piston 100. That extension is transmitted to the ballast weight block 172 by way of the hydraulic piston 100 and the lift spindle 68 and which are prevented from possibly buckling by virtue of the connection to the lower leg 54 of the lift arm 48.

The ballast weight carrier 116 can now be displaced longitudinally within a range which is dependent on the stroke of the hydraulic pistons 100 up to the position shown in FIG. 8. In that position, the ballast weight block 172 exerts the greatest moment about the rear axle of the tractor and most effectively prevents the tractor from rearing up. When the operating condition which requires a large moment of that kind no longer obtains, then the entire ballast weight carrier 116 can be pulled back towards the front part 10 of the tractor by actuating the hydraulic pistons 100 at the piston rod side. It is apparent that adapting the ballasting of the front part 10 of the tractor to the fluctuating operating conditions in the above-indicated manner can be effected very quickly and without effort or trouble for the driver of the tractor.

If the tractor is to be converted back again, the ballast weight carrier 116, if it should be in a position in which it is away from the front part 10, is to be moved into its rearmost position. The securing levers 236 of the upper locks 136 are then to be moved into engagement in the unlocking notches 248 so that as soon as the ballast weight block 172 is listed, the plates 222 are pivoted in the clockwise direction under the effect of the coil springs 244. In addition, the locking levers 198 are to be pivoted into their unlocking positions in a clockwise direction about their mounting pins 194, whereby the spring elements 186 perform a pivotal movement and, due to their positive connection to the locking pins 178, lift the pins and move the base portions 180 out of the gaps 162 that lead to the guideways 168 so that as soon as the ballast weight block 172 is lowered, the slide rod 164 can come out of the guideways 168 again. In addition, the arresting screw 268 of the locking member 140 is to be released again and unscrewed so that the first portion 258 of the bracket 250 can be drawn out of the depression 288 in the ballast weight block 172 and can be pivoted sideways out of the plane of movment thereof.

Finally, the operations which were described above in relation to picking up the ballast weight block 172, regarding mounting the lift spindles 68, and the procedure in relation to the ballast weight block 172, may be carried out in the reverse sequence. Then, when the ballast weight block 172 is let down onto the surface on which the tractor stands, by the retraction of the hydraulic pistons 100, the ballast weight carrier 116 can be pulled out of the main frame 24 of the attachment arrangement 22 and can be stored away from the tractor, or it may also remain there as it does not extend into the region of movement of the lower links 50 and the upper link.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A coupling arrangement for attachment to a front end of a vehicle, comprising:
    a fixed frame fixed to the vehicle;
    an angle lever pivotally coupled to the fixed frame and having first and second legs;
    an actuator coupled to one of the legs of the angle lever;
    an equipment device including a support member and a guide member projecting therefrom;
    an ancillary frame slidably mounted to the fixed frame, the ancillary frame including a guideway for slidably receiving the guide member of the equipment device; and
    a coupling strut including means at one end thereof for coupling to the other leg of the angle lever and means at the other end thereof for coupling to the support member of the equipment device.

2. The arrangment of claim 1, comprising at least one lower link pivotally coupled to the fixed frame, and the coupling strut having one end pivotally coupled to the angle lever, the other end of the coupling strut being selectively connectible to the lower link and to the support member.

3. The arrangement of claim 1, wherein one end of the coupling strut is pivotally coupled to the support member, the other end of the coupling strut being selectively coupled to the first and second legs of the angle lever, movement of the actuator causing movement of the equipment device and the ancillary frame in a direction parallel to a longitudinal center plane of the vehicle when the other end of the coupling strut is coupled to the one leg of th e angle lever.

4. The arrangement of claim 1, wherein:
    the ancillary frame comprises two frame members which extend parallel to a longitudinal center plane of the vehicle and which can be displaceably inserted between the fixed frame and the vehicle.

5. The arrangement of claim 1, wherein the ancillary frame comprises at least one contact surface for engaging the guide member of the equipment device, the contact surface having an upper end and a lower end, the upper end being spaced forwardly from the lower end.

6. The connecting and coupling arrangement of claim 1, wherein the guide member comprises a rod which passes through the equipment device and projects laterally therefrom, and the ancillary frame has shaped rail members on each side for engaging the guide member.

7. The connecting and coupling arrangement of claim 6, wherein the rail members comprise:
    tapered pick-up ramps for engaging the guide member and which extend to guideway pockets which are formed in the railmembers.

8. The arrangement of claim 7, wherein:
    spring loaded locking means are provided at one end of each guideway pocket for closing said one end of each guideway pocket.

9. The connecting and coupling arrangement of claim 8, wherein the locking means includes a locking pin with a tapered base portion, a lever for moving the pin into a locking position and into an unlocking position, and a spring for urging the tapered base into engagement with the ramps when the tapered base is in the locking position.

10. The connecting and coupling arrangement of claim 8, wherein:
    the locking means includes an upper lock with a pivotable shaped plate, the equipment device having hook-shaped openings, the shaped plate being movable between a locking position and an unlocking position, the shaped plate engaging the associted hook-shaped opening when in the locking position.

11. The connecting and coupling arrangement of claim 10, wherein the shaped plate can be moved into the unlocking and locking positions under the force of a spring-loaded lever.

12. The connecting and coupling arrangement of claim 10, wherein the upper lock is positioned adjacent one end of each guideway pocket.

13. The connecting and coupling arrangement of claim 8, wherein the locking means includes a swinging locking bar with a bracket having a double bend therein, the equipment device having a recess therein for receiving the bracket, the bracket being secured to the ancillary frame by way of a clamp.

* * * * *